June 20, 1961 E. J. WALDEN 2,988,876
IGNITION OF SOLID ROCKET PROPELLANTS
Filed Dec. 26, 1957 2 Sheets-Sheet 1
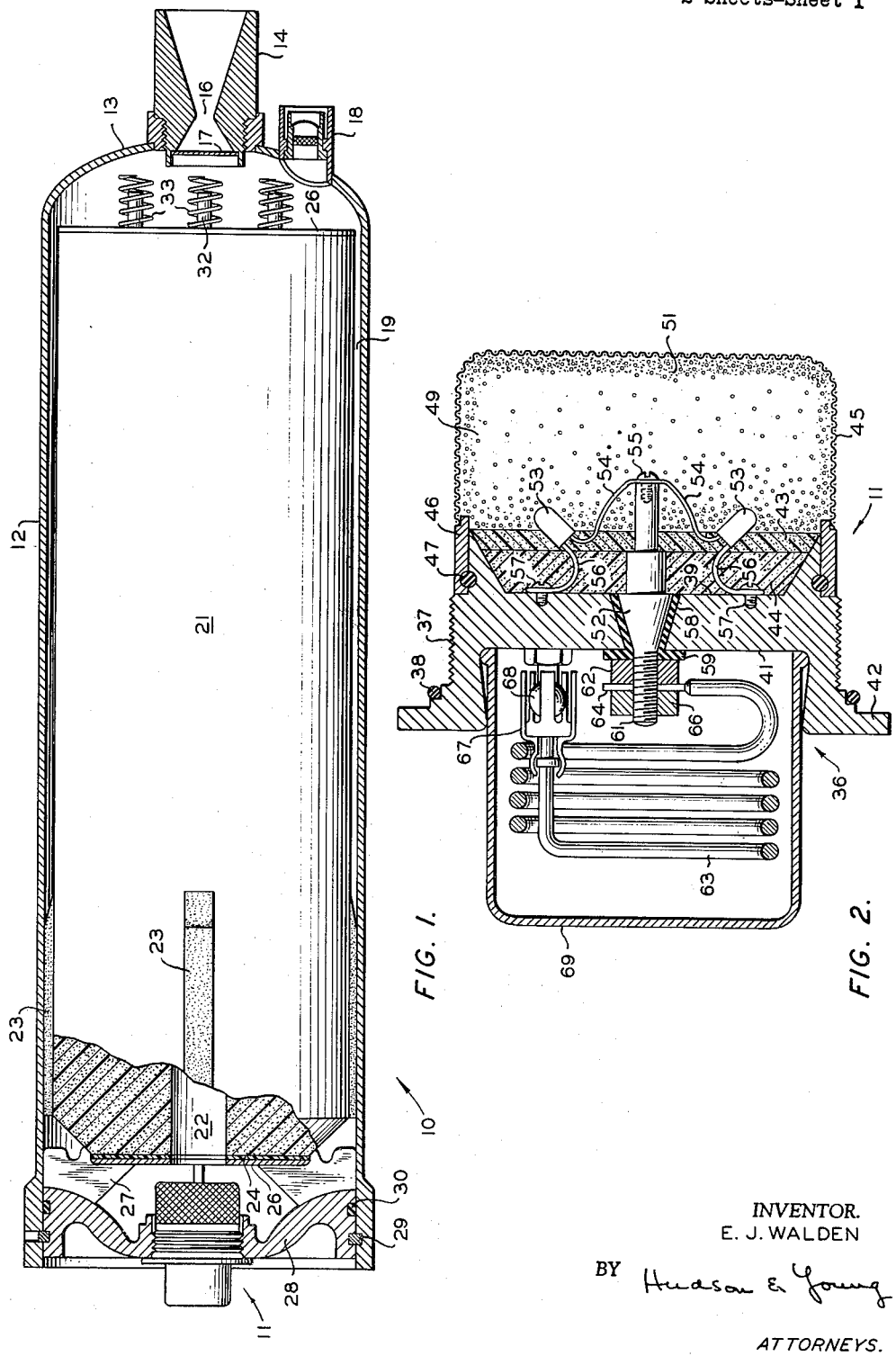
INVENTOR.
E. J. WALDEN
BY Hudson & Young
ATTORNEYS.

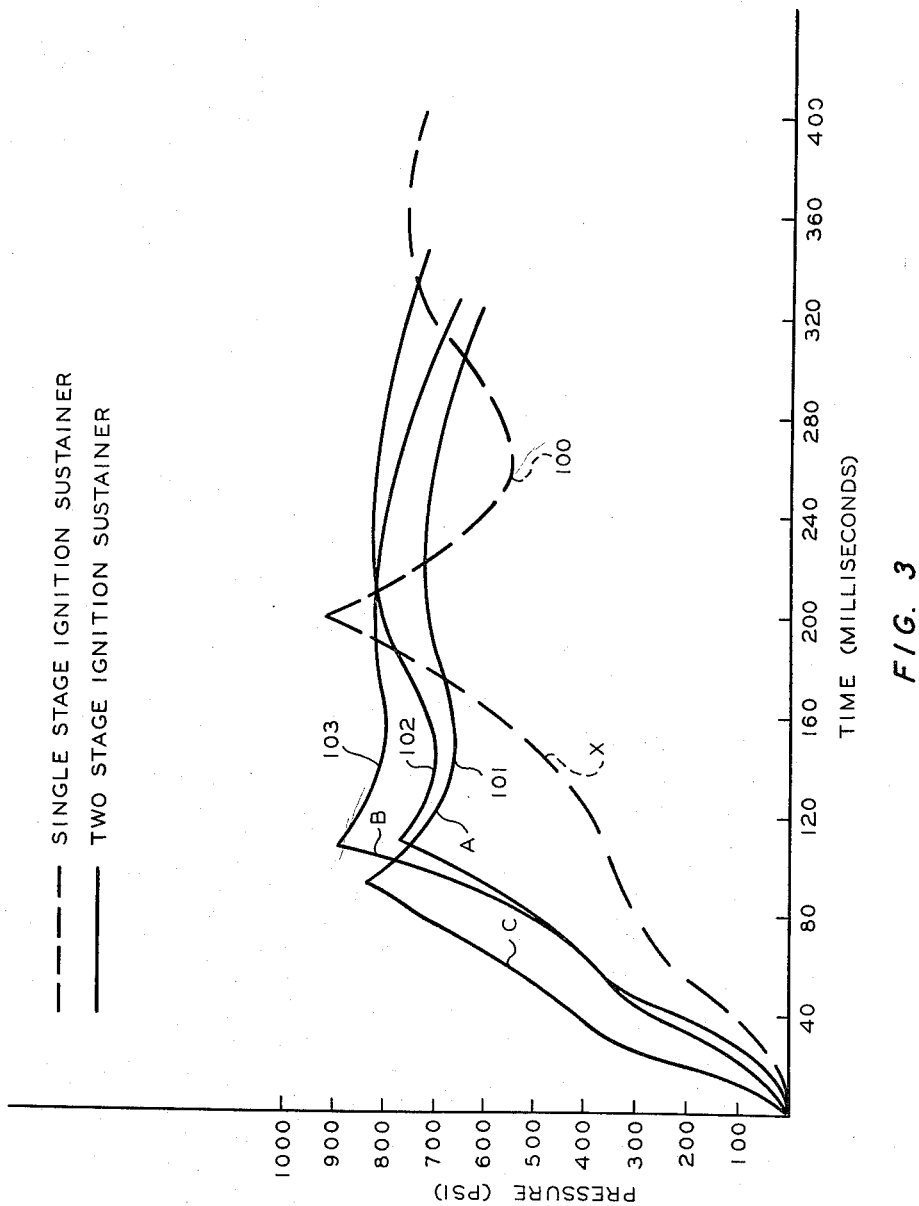

United States Patent Office 2,988,876
Patented June 20, 1961

2,988,876
IGNITION OF SOLID ROCKET PROPELLANTS
Ernest J. Walden, Los Angeles, Calif., assignor to Phillips Petroleum Company, a corporation of Delaware
Filed Dec. 26, 1957, Ser. No. 705,464
7 Claims. (Cl. 60—35.6)

This invention relates to solid rocket propellants. In one aspect, it relates to an improved means for igniting solid rocket propellants, such as those propellants loaded in rocket motors employed to assist the take-off of aircraft. In still another aspect, it relates to novel igniter compositions for use in igniting a solid rocket propellant, such as that propellant commonly referred to in the art as composite propellant comprising a binder and a solid oxidant.

Recently, superior solid propellant materials have been discovered which comprise a major proportion of a solid oxidant, such as ammonium nitrate or ammonium perchlorate, and a minor amount of a rubbery binder material, such as a copolymer of a conjugated diene and a vinylpyridine or other substituted heterocyclic nitrogen base compound, which after incorporation is cured by a vulcanization reaction. Solid propellant mixtures of this nature and a process for their production are disclosed and claimed in copending U.S. application Serial No. 284,447, filed April 25, 1952, by W. B. Reynolds and J. E. Pritchard. While it is not intended to so limit the instant invention, it is especially applicable to rocket motors which employ these solid propellant materials.

These aforementioned composite solid rocket propellants are inherently difficult to ignite, especially where ammonium nitrate is utilized as the solid oxidant. Ammonium nitrate-binder composite solid rocket propellants have a relatively high auto-ignition temperature (e.g., 600° F.) and while their specific heats are relatively high, their heat transfer coefficients are low. As a result, it is often difficult to reproduce the ignition of these propellants throughout a wide range of temperature conditions. Service requirements for rocket motors loaded with these types of propellants are severe, and military acceptance of a particular rocket motor design loaded with these propellants often requires proven, satisfactory and reproducible ignition, for example, in the temperature range of about −75° F. to +170° F., or more generally in the range of from −60° F. to +160° F. Generally, these solid composite propellants are more difficult to ignite and burn at the lower end of the temperature range, i.e., −60° F. to −75° F., than at the higher temperatures.

To insure complete ignition of the solid propellant in a relatively short time, i.e., a matter of milliseconds, the pressure in the combustion chamber of the rocket motor is rapidly increased after firing and ignition of the propellant by means of a starter disk positioned across the converging-diverging passage of the reaction nozzle attached to the rocket motor. However, following the functioning of the starter disk, the combustion chamber pressure drops rapidly, as evidenced by the high pressure peaks on the pressure vs. time curve, or the high thrust peaks on the thrust vs. time curve. Although thereafter the pressure builds up rapidly to an operating pressure, this drop in pressure, which is often represented by a "saddle" on the pressure or thrust vs. time curves, is evidence of unsatisfactory ignition. If the pressure drop following the functioning of the starter disk is severe, that is if the saddle is very pronounced, a misfire or hang-fire may occur, which phenomenon most often occurs at relatively low temperatures, e.g., −75° F.

While it is known that the saddle problem can be ameliorated somewhat by employing ignition sustaining material to supplement the pyrotechnic material employed as primary source of hot ignition products, the saddle problem is still often significant and an undesirable statistical number of misfires or hang-fires generally results.

Accordingly, an object of this invention is to improve the ignition of solid rocket propellants. Another object is to provide means for igniting solid rocket propellants of the composite type comprising a binder and a solid oxidant. Another object is to provide ignition sustaining means to insure proper and reproducible ignition of solid propellants immediately after the functioning of the rocket motor starter disk during the normal "saddle" period. Another object is to improve the ignition of composite solid rocket propellants comprising, for example, a rubbery copolymer and ammonium nitrate, especially when these propellants are ignited at low temperatures, e.g., −60 to −75° F. Another object is to minimize the statistical number of misfires and hang-fires upon ignition of a solid rocket propellant. Another object is to provide a rocket motor loaded with solid rocket propellant and having an improved ignition means. Other objects and advantages of this invention will become apparent from the following discussion, appended claims, and drawings in which:

FIGURE 1 is a side elevational view in partial section of a rocket motor equipped with the improved ignition means of this invention;

FIGURE 2 is an enlarged view in partial section of the ignition means illustrated in FIGURE 1; and FIGURE 3 is a graph illustrating the improvement and advantages of this invention.

Referring now to the drawing, and in particular to FIGURE 1, there is illustrated a rocket motor 10 which includes igniter assembly 11 of the instant invention. The rocket motor comprises a cylindrical metal casing 12 which has a reduced aft portion 13 having an axial opening into which a reaction nozzle 14 is threaded. The nozzle is formed with internal restrictions so as to define a converging-diverging passage 16 through which the combustion gases pass. A blow-out diaphragm or starter disk 17, which covers the inner opening into passage 16, is designed so as to be ejected through the nozzle passage when the chamber pressure reaches a predetermined value, e.g., between 200 and 500 p.s.i. The reduced casing portion of the rocket motor is also provided with a safety plug attachment 18 which is adapted to rupture at a predetermined chamber pressure. By providing for this attachment, the buildup of excessive pressures in the combustion chamber which might rupture the cylindrical casing of the rocket motor is prevented. Any suitable device for releasing excessive pressure can be utilized as is well known to those skilled in the art.

The cylindrical casing defines a combustion chamber 19 in which the solid propellant charge 21 is disposed. The specific propellant charge illustrated is cylindrical in shape and has an outer diameter smaller than the inner diameter of the casing. The propellant is an internal-external burning type by reason of its exposed or unrestricted outer surface and its inner exposed surface which is defined by an axial perforation 22 extending the length of the propellant. A plurality of resilient retaining pads 23, e.g., strips of sponge rubber, are positioned between the head portion of the external burning surface and the adjacent head portion of the casing. The ends of the propellant are restricted by means of a layer of restricting material 24 which has a central opening in alignment with perforation 22. Retaining plates 26 having similar openings cover the outside of the restricting material. Secured to the head retaining plate are outer-extending prongs or legs 27 which are adapted to register with and are held in place by head closure assembly 28 having retention means for igniter assembly 11. Head closure assembly 28 is held in position in the head end of casing 12 by means of key 29 which fits into appropriate grooves formed in the casing and head closure assembly 28. A sealing ring 30 is positioned in a groove cut into assembly 28 to prevent escape of combustion gases from the head end of the casing. The head end of the cylindrical casing is closed by means of head closure assembly 28 in combination with the igniter assembly which is retained in the opening provided in the axial portion of assembly 28. It is noted that the removable cover of the igniter assembly extends through this axial opening.

The aft retaining plate has secured to its outer surface a plurality of prongs 32. The prongs are each surrounded by a compression spring 33 adapted to come into contact with the reduced portion 13 of the casing. The aft retaining plate is thereby maintained firmly against the restricting material which covers the after end of the solid propellant.

It is to be understood that the utility of the improved ignition means of this invention is not limited to the particular propellant charge 21 illustrated in FIGURE 1. It is within the scope of this invention to ignite any type of charge, such as the external-burning type, the internal burning type, the end-burning type, etc. Moreover, a rocket motor can be loaded with a plurality of propellant grains and a plurality of igniter assemblies like 11 of FIGURE 1 can be attached to the rocket motor.

Referring now to FIGURE 2 of the drawing, there is illustrated in detail the various elements of igniter assembly 11. The igniter assembly comprises an igniter plug 36 which is provided with external threads 37. As shown in FIGURE 1, these threads provide means for securing the plug in head closure assembly 28 attached to the head end of the rocket motor casing. An O-ring 38, which comes into contact with assembly 28 when the igniter assembly is placed in the rocket motor, furnishes a gas-tight seal for the head end of the motor. The inner and outer faces 39 and 41, respectively, of the igniter plug are countersunk so as to form recessed portions or cavities in the ends of the plug. The outer end of the plug is provided with shoulders 42 which are in contact with head closure assembly 28 when the igniter assembly is in position as shown in FIGURE 1.

Disposed within the inner recessed portion or cavity of the igniter plug is a relatively thin disc (e.g., 0.1 inch) of a primary sustainer composition 43, the inner face of which is in contact with a disc of a secondary sustainer composition 44. A frangible container 45, such as a wire basket or plastic (e.g., nylon) cup, has a lip which attached to the inner end of the igniter plug. As illustrated, this attachment is accomplished by welding or brazing container 45 to a ring member 46 which in turn is held in place on the igniter plug by means of wire 47. Where the container 45 is a wire basket, the perforations in container are closed by dipping the container into a rubber solution or by coating with plastic material such as cellulose acetate plastic molding compound or other suitable covering material which will rapidly soften or rupture upon being subjected to heat. For a more complete description of the wire basket and covering materials which can be employed, reference can be had to copending U.S. application Serial No. 605,904, filed August 23, 1956, by O. D. Ratcliff. An igniter material 49, which serves as the principal source of hot ignition products, is disposed within the container in contact with the ignition sustaining material 43. The igniter material 49 is preferably in granular or pelleted form and is held firmly in place within the container 45 and against the ignition sustaining material 43 by means of a thin layer of material 51, such as cotton, placed in the end of the container. While it is not intended to limit the invention to any particular igniter material, and any suitable material can be utilized, e.g., black powder, an especially useful igniter material is disclosed in copending U.S. application Serial No. 592,995, filed June 21, 1956, by L. G. Herring. As disclosed in the Herring application, the igniter composition is formed of a plurality of discrete pellets comprising powdered metal, powdered oxidizing material, and a binding agent, ethylcellulose. Table I sets forth a general recipe for this type of principal igniter material and Table II sets forth specific compositions.

*Table I*

| Igniter ingredients | Parts by weight | Weight percent |
|---|---|---|
| Pyrotechnic components | | 98-85 |
|   Potassium perchlorate | 0-68 | |
|   Barium nitrate | 0-70 | |
|   Zirconium dichromate | 0-58 | |
|   Zirconium/nickel alloy | 0-80 | |
|   Aluminum | 0-33 | |
|   Magnesium | 0-47 | |
|   Titanium | 0-65 | |
|   Zirconium hydride | 0-2 | |
|   Boron | 0-9 | |
| Supplemental pressure components | | 0-5 |
|   Black powder | 0-3 | |
|   Tetranitrocarbazole | 0-5 | |
| Binding agent: ethylcellulose | | 2-15 |

*Table II*

| Ingredient | Formulation B 68, weight percent | Formulation B 73, weight percent |
|---|---|---|
| Potassium Perchlorate | 50 | 26.5 |
| Barium nitrate | 15 | 16.6 |
| Zirconium-nickel alloy | 32 | 53.9 |
| Ethylcellulose | 3 | 3.0 |

An electrical conductor or contact member 52 extends through a central opening of plug 37 and ignition sustaining materials 42, 44. One end of the contact member 52 terminates exteriorly of the outer face of the plug while the other end extends into the igniter material 49 disposed within container 45. A pair of electrical ignition means 53, which can be squibs, electrical matches, or other suitable ignition means, are disposed within the container 45 in contact with the igniter material 49 therein. Electrical leads 54 which are connected to the squibs are further attached to contact member 52 by means of a bolt 55 threaded into the end of that member. The squibs are grounded to the plug by means of electrical leads 56 which are connected to the igniter plug by means of bolts 57. Contact member 52 is prevented from contacting plug 36 by means of insulating member 58. The outer end of contact member 52 is provided with threads 61 upon which there is threaded a nut 62 for holding in place the contact member as well as insulating member 58. Insulating washer 59 is disposed between outer face 41 of the plug and nut 62 to prevent contact between these two elements. Electrical lead 63 has one of its ends connected to contact member 52 by means of a circular contact 64 which fits over the end of the contact member. Contact 64 is held in place by means of a nut 66 threaded onto the end of contact member 52. The other end of electrical lead 63 has a plug 67 connected thereto to furnish means for connecting the igniter assembly to a source of electrical current. Attached to the outer face of the plug is a ballstud 68 to which plug 67 is attached when disconnected from the source of electrical current. A cover 69 fits into the outer recessed portion of the igniter plug, thereby covering the outer end of contact member 52 and electrical lead 63 connected thereto. When it is desired to place the rocket motor in readiness for firing, cover 69 is removed after which plug 67 is detached from ballstud 68 and plugged into an electrical circuit which includes a source of current, such as a storage battery.

In the operation of the rocket motor shown in the drawing, the motor is armed by removing cover 69 from the igniter assembly and connecting plug 67 of electrical lead 63 into an electrical circuit, not shown, which includes a source of power. Upon closing of a suitable switch, electrical current flows to squibs 53 through electrical lead 63, contact member 52 and electrical leads 54. On being supplied electrical current, the squibs function in a manner well known in the art to ignite igniter material 49 with which they are in contact.

The igniter material 49 in burning forms hot combustion products which break the frangible container 45, for example the products soften or rupture the plastic or rubbery material covering the perforations of container 45. These primary ignition combustion products then enter the combustion chamber 19 of the rocket motor. The heat from this principal source of igniter combustion products is transferred to the exposed internal and external burning surfaces of the propellant grain, raising the same to an ignition temperature. The propellant material then burns and generates combustion gases which raise the pressure in the rocket motor combustion chamber 19 to a desired working pressure. During this time, the ignition of the primary igniter material 49 results in the ignition of the primary sustainer material 43 in contact therewith. The primary sustainer material 43 has a relatively slow burning rate and is designed to be burned through by the time the starter disk in the rocket motor ruptures or at start of the customary pressure saddle, the most critical ignition period. When the combustion chamber pressure reaches a starter disk bursting pressure, the starter disk 17 functions, for example by rupturing, thereby permitting the combustion gases in the combustion chamber to escape via the nozzle passage. When the primary ignition sustaining material 43 burns through, the secondary sustainer composition 44 (which is contiguous with the primary sustainer 43 but isolated from the primary igniter material) is ignited and has a burning rate which is designed to furnish supplemental ignition combustion products during the pressure saddling period following the functioning of the starter disk 17. For example, while the igniter material 49 may burn for about the first 150 milliseconds after firing, the primary sustainer material 43 burns for a period of from 75 to 125 milliseconds thereafter, and the secondary sustainer material 44 burns for about 200–300 milliseconds thereafter. It is to be understood that the length of the burning periods of the primary ignition material 49 and the primary and secondary sustainer compositons 43, 44 can be controlled by varying the compositions thereof as well as the amount of material employed. Following the functioning of the starter disk 17, the combustion gases flow through the nozzle passage 16 at a high velocity and impart thrust to the rocket motor.

The primary and secondary sustainer materials used in this invention bath comprise a mixture of (1) a solid oxidant, such as the ammonium, alkali metal, and alkaline earth metal salts of nitric, perchloric and chloric acids; (2) a rubbery polymer as a binder; and (3) finely divided or powdered metal, such as aluminum, magnesium, or titanium. The burning rates of these two ignition sustaining materials differ, the primary sustainer having a relatively slow burning rate and the secondary sustainer having a relatively faster burning rate. The relative amounts of the essential ingredients of these two materials are set forth in Table III.

*Table III*

| Essential ingredient | Primary sustainer, weight percent | Secondary sustainer, weight percent |
| --- | --- | --- |
| Oxidant | 20–35 | 40–75 |
| Binder | 45–55 | 10–40 |
| Powder metal | 3–25 | 3–25 |

Suitable oxidants which can be utilized in these sustainers representatively include ammonium nitrate, ammonium perchlorate, sodium nitrate, barium nitrate, lithium perchlorate, potassium chlorate, sodium perchlorate, and the like, including mixtures thereof. These oxidants are utilized in finely divided form, e.g., 100 to 250 mesh.

The rubbery polymer serves as a fuel as well as a binder for the other ingredients. Especially useful rubbery polymers which can be used as the binder are polysulfide liquid polymers, such as those prepared by the Thiokol Chemical Company, Trenton, New Jersey, and designated LP–2, LP–3, LP–8, LP–32, and LP–33, depending upon the degree of crosslinking and degree of polymerization. Other applicable rubbery polymers which can be used as binders in this invention include those disclosed in the copending application Serial No. 284,447, filed April 25, 1952 by W. B. Reynolds et al., such as a copolymer of a conjugated diene (e.g., 1,3-butadiene) and a heterocyclic nitrogen base compound having a $CH_2=C<$ group (e.g., 2-methyl-5-vinylpyridine). Other useful rubbery polymers include GR–S rubber, Neoprene, and the like. Polyurethanes are also applicable as binders, a typical composition comprising 30–40 parts by weight castor oil, 30–40 parts by weight Flexiricin 15 (ethylene glycol monoricinoleate), and 20–35 parts by weight Nacconate 65 (toluene diisocyanate).

Polysulfide polymers are preferably used as binders in this invention because they can be readily molded and cured at low temperatures (e.g., room temperature).

Various other compounding ingredients can be incorporated into the sustainer materials to stabilize combustion and increase the burning rate, e.g., $Fe_2O_3$, copper chromite, ammonium dichromate, Milori blue, and other compounds normally used as burning rate modifiers or catalysts in solid rocket propellant formulations. Suitable smoke depressants, e.g., MgO, can also be incorporated. Plasticizers can also be incorporated into the sustainer mixture, e.g., Philrich 5 (a highly aromatic oil), Sundex 53 (aromatic product derived from petroleum), chlorowax 40 (liquid chlorinated paraffins), Califlux TT (naphthenic hydrocarbon, predominately unsaturated) TP–90B (dibutoxyethoxyethyl formal), ZP–211 (same as TP–90B except that it is topped to remove low boiling materials), and the like. Various curing agents can be added, e.g., sulfur, GMF (p-quinone dioxine) etc., as well as curing accelerators, e.g., DPG (diphenyl guanidine), Philcure 113 (SA–113 N,N-dimethyl-S-tertiary butylsulfenyl dithiocarbamate), butyl 8 (a dithiocarbamate-type rubber cure accelerator), and the like. Various fillers can also be incorporated such as various carbon blacks sold under trade names like Thermax, P–33, Philblack A, Kosmos 20, Pelletex, and Sterling LL.

In general, suitable binder formulations which can be used have recipes falling within the ranges given in Table IV.

*Table IV*

Binder ingredient: Parts per 100 parts rubber
- Rubber (LP–3) _____ 100
- Curing agent (GMF) _____ 6–8
- (S) _____ 0.25–2.50
- Curing accelerator (DPG) _____ 2.5–3.5
- Smoke depressant (MgO) _____ 0.5–2.0
- Plasticizer (ZP–211) _____ 0–15
- Filler (Thermax) _____ 5–25
- Burning rate catalyst ($Fe_2O_3$) _____ 0–7.8

Particularly useful sustainer formulations are set forth in Table V.

Table V

|  | Sustainer | | | |
| --- | --- | --- | --- | --- |
|  | I | II | III | IV |
| Ingredient:[1] | | | | |
| LP-3 | 100 | 100 | 100 | 100 |
| GMF | 7 | 7 | 7 | 7 |
| DPG | 3 | 3 | 3 | 3 |
| S | 2 | 0.5 | 2 | 2 |
| MgO | 1 | 1 | 1 | 1 |
| ZP-211 | 5 | 5 | 5 | 5 |
| Thermax | 20 | 10 | 20 | 20 |
| $Fe_2O_3$ | 1 | 1.5 | 1 | |
| Al | 10 | 33 | 10 | 10 |
| $NH_4ClO_4$ | 50 | | 100 | 100 |
| $KClO_4$ | | 301 | | |
| Burning rate [2] (est.) | 0.4 | 0.75 | | 0.6 |

[1] Parts per 100 parts rubber.
[2] In./sec. @ 500 p.s.i., $-75°$ F.

The various ingredients in the sustainer compositions may be mixed on a roll mill or an internal mixer such as a Banbury or a Baker-Perkins dispersion blade mixer may be employed. The sustainers can be formed in any desired shape by compression molding, injection molding, or extrusion. The curing can be accomplished at room temperature, but the overall cure time can be reduced by heating at a tempeature in the range of 100° to 180° F. It is also within the scope of the invention to pour the mixed ingredients of the sustainer compositions into the inner cavity of the igniter assembly and effect the cure in place at ordinary temperatures.

The solid propellants which can be ignited with the novel ignition means of this invention include any of those known being fabricated, e.g., dual or composite base, mono-base, etc. The composite base propellants disclosed and claimed in said copending application Serial No. 284,447 by W. B. Reynolds et al. have proven to be readily ignited according to this invention and therefore are preferred. These preferred composite propellants are of the rubbery copolymer-oxidant type which is plasticized and worked to prepare an extrudable mass at 130° to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded grains of propellant at temperatures preferably in the range of 170° to 185° F. In addition to the copolymer binder and other ingredients, the propellant composition comprises an oxidant and a burning rate catalyst.

The copolymers are preferably formed by copolymerization of a vinyl heterocyclic nitrogen compound with an open chain conjugated diene. The conjugated dienes preferably employed are those containing 4 to 6 carbon atoms per molecule and representatively include 1,3-butadienes, isoprene, 2,3-dimethyl-1,3-butadiene, and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed can be in the range between 75 and 95 parts by weight per 100 parts monomers and the vinyl heterocyclic nitrogen can be in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10–40, preferably in the range of 15 to 25, and may be masterbatched with 5–20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex Marasperse-CB, or similar surface active agent, can be added to the carbon black slurry or to the water used to prepare the slurry.

The following empirical formulation or recipe generally represents the class of propellant compositions preferred for the preparation of the grains of propellant of this invention:

Table VI

| Ingredient | Parts per 100 parts of rubber | Parts by Weight |
| --- | --- | --- |
| Binder | | 10–25 |
| Copolymer (Bd/MVP) | 100 | |
| Philblack A (a furnace black) | 10–30 | |
| Plasticizer | 10–30 | |
| Silica | 0–20 | |
| Metal oxide | 0–5 | |
| Antioxidant | 0–5 | |
| Wetting agent | 0–2 | |
| Accelerator | 0–2 | |
| Sulfur | 0–2 | |
| Oxidant (Ammonium nitrate) | | 75–90 |
| Burning rate catalyst | | 0–30 |

Suitable plasticizers useful in preparing these grains of propellant include TP–90–B; benzophenone; and Pentaryl A (monoamylbiphenyl). Suitable silica preparations include a 10–20 micron size range supplied by Davison Chem. Co.; and Hi-Sil 202, a rubber grade material supplied by Columbia-Southern Chem. Corp. A suitable anti-oxidant is Flexamine, a physical mixture containing 25 percent of a complex diarylamine-ketone reaction product and 35 percent of N,N'-diphenyl-p-phenylenediamine. A suitable wetting agent is Aerosol-OT (dioctyl sodium sulfosuccinate). Satisfactory rubber cure accelerators include Philcure 113; butyl-8; and GMF. Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, and the like, can also be used.

The layer of restricting material can be made from any of the slow burning materials used for this purpose in the art, such as cellulose acetate, ethylcellulose, butadiene-methylvinylpyridine copolymer, GR–S, natural rubber, and the like.

A fuller understanding of the advantages of this invention can be had by referring to FIGURE 3 of the drawing, wherein typical pressure vs. time curves are shown representing graphically results obtained by actually firing rocket motors like that of FIGURE 1 loaded with solid propellant charges prepared according to said copending application Serial No. 284,447 by W. B. Reynolds et al. comprising a rubber copolymer binder of 1,3-butadiene and 2-methyl-5-vinylpyridine with ammonium nitrate as the oxidant. Only portions of the pressure vs. time curves are shown, representing the period up to the functioning of the starter disc and immediately thereafter to illustrate the "saddle" problem, beyond which the igniter does not influence the burning of the propellant and the normal operating pressure of the rocket motor is relatively constant to burn-out. Curves A, B, and C represent firings at −75° F. of rocket motors provided with primary and secondary sustainers. For comparison purposes, a control rocket motor was also fired at −75° F., which rocket motor was provided with a similar igniter having only a single sustainer; the results of the firing of the control rocket motor are represented as curve X in FIGURE 3. The firing data for these rocket motors are set forth in Table VII. In all cases about 90 grams of Formulation B68 (Table II) was used as the principal ignition material in the form of granules loaded in a nylon cup.

*Table VII*

| Igniter System | Pressure vs. time curve | Sustainer Combination (See Table V) | Ignition delay a (ms.) | Igniter shock b (lbs.) | Pressure saddle c (p.s.i.) | Initial Operating pressure d (p.s.i.) |
| --- | --- | --- | --- | --- | --- | --- |
| Two stage sustainer | A | I and IV | 150 | 63 | 710 | 575 |
| Do | B | I and IV | 124 | 596 | 810 | 565 |
| Do | C | I and IV | 135 | 151 | 660 | 500 |
| Single stage sustainer | X | III | 230 | 450 | 550 | 760 | a Time in milliseconds from application of current to starter disc rupture.
b First pressure peak.
c Lowest point of saddle.
d Point at which curve levels off.

In evaluating the curves of FIGURE 3, it is to be understood that the occurrence of a "saddle" in the pressure vs. time curve is only considered significant and undesirable if the pressure at the lowest point of the saddle is below the initial (but fully ignited) operating pressure of the rocket motor. If the pressure at the lowest point in the saddle is above the initial operating pressure, the occurrence of a saddle is regarded as insignificant and indicative of a very low statistical probability of a misfire or hangfire.

In all 4 curves of FIGURE 3 a peak is illustrated and represents the point in the ignition transient when the starter disc functioned. Previous experience has shown that with similar rocket motors equipped with igniter devices having no sustaining composition (i.e., only a principal source of ignition products), the curve would fall rapidly after the starter disc peak about 10 percent of the time at −75° F. and approach zero pressure, thus resulting in a misfire or hangfire.

Referring to control curve X of FIGURE 3, it is to be noted that not only is there a long ignition delay (260 ms.), but the curve exhibits a pronounced saddle 100, the pressure at the lowest point (550 p.s.i.) being significantly lower than the initial operating pressure (760 p.s.i.). It is thus seen that the provision of a single stage sustainer is inadequate to insure ready and efficient ignition of a solid propellant rocket motor. However, with the two stage sustainer ignition system of this invention, the statistical probability of misfire or hangfire is significantly lessened, as illustrated by curves A, B and C of FIGURE 3 where it is to be noted the lowest points of each of the moderate saddles 101, 102, 103 are at pressures which in all three instances are above the respective initial operating pressures.

Various modifications and alterations of this invention will become apparent to those skilled in the art without departing from the scope and spirit of this invention and it is to be understood that the foregoing discussion and drawing merely represent preferred embodiments of this invention and do not unduly limit the same.

I claim:
1. An igniter assembly comprising, in combination, an igniter plug, a container attached to said plug, particulate ignition material in said container, means to ignite said ignition material, primary ignition sustaining material in said container and contiguous with said particulate ignition material, and secondary ignition sustaining material in said container contiguous with said primary ignition sustaining material and isolated from said particulate ignition material by said primary ignition sustaining material, the latter comprising the following composition:

| | Weight percent |
| --- | --- |
| Oxidant | 20–35 |
| Binder | 45–55 |
| Powdered metal | 3–25 | said secondary ignition sustaining material comprising the following composition:

| | Weight percent |
| --- | --- |
| Oxidant | 40–75 |
| Binder | 10–40 |
| Powdered metal | 3–25 |

2. In an igniter assembly for a rocket motor loaded with solid propellant, said igniter assembly comprising, in combination, an igniter plug, a frangible container secured to said plug, particulate ignition material filling said container, and electrical means passing through said plug and extending into said container, primary ignition sustaining material in said container and contiguous with said particulate ignition material, and secondary ignition sustaining material in said container disposed within said container between said plug and said primary ignition sustaining material, the latter comprising the following composition:

| | Weight percent |
| --- | --- |
| Oxidant | 20–35 |
| Binder | 45–55 |
| Powdered metal | 3–25 | said secondary ignition sustaining material comprising the following composition:

| | Weight percent |
| --- | --- |
| Oxidant | 40–75 |
| Binder | 10–40 |
| Powdered metal | 3–25 |

3. In an igniter assembly for a rocket motor loaded with solid propellant, said igniter assembly comprising, in combination, an igniter plug having a recessed inner face forming a cavity, a frangible cup the lip of which is secured to periphery of said inner face, particulate ignition material filling said cup and serving as a principal source of ignition combustion products, and an electrical ignition initiator means passing through said plug and extending from said inner face into said cup, the inner extremity of said initiator being in contact with said particulate ignition material and adapted to ignite the same, a first disc of primary ignition sustaining material disposed within said plug cavity, the inner face of said first disc being contiguous with said particulate ignition material, and a second disc of secondary ignition sustaining material disposed within said plug cavity between said inner face of said plug and the outer face of said first disc of primary ignition sustaining material, the latter comprising the following composition:

|  | Weight percent |
|---|---|
| Oxidant | 20–35 |
| Binder | 45–55 |
| Powdered metal | 3–25 | said secondary ignition sustaining material comprising the following composition:

|  | Weight percent |
|---|---|
| Oxidant | 40–75 |
| Binder | 10–40 |
| Powdered metal | 3–25 |

4. The igniter assembly of claim 3 wherein said oxidant of said first and second disc comprises ammonium perchlorate, said binder comprises a polysulfide liquid polymer, and said powdered metal comprises aluminum.

5. In a rocket motor comprising a casing defining a combustion chamber, a reaction nozzle secured to the aft end of said casing, a solid propellant charge loaded in said chamber, and an igniter assembly secured to the head end of said casing and projecting into said chamber, said igniter assembly comprising, in combination, an igniter plug having a recessed inner face forming a cavity, a frangible cup the lip of which is secured to periphery of said inner face, particulate ignition material filling said cup and serving as a principal source of ignition combustion products, and an electrical ignition initiator means passing through said plug and extending from said inner face into said cup, the inner extremity of said initiator being in contact with said particulate ignition material and adapted to ignite the same, a first disc of primary ignition sustaining material disposed within said plug cavity, the inner face of said first disc being contiguous with said particulate ignition material, and a second disc of secondary ignition sustaining material disposed within said plug cavity between said inner face of said plug and the outer face of said first disc of primary ignition sustaining material, the latter comprising the following composition:

|  | Weight percent |
|---|---|
| Oxidant | 20–35 |
| Binder | 45–55 |
| Powdered metal | 3–25 | said secondary ignition sustaining material comprising the following composition:

|  | Weight percent |
|---|---|
| Oxidant | 40–75 |
| Binder | 10–40 |
| Powdered metal | 3–25 | said binder comprising the following composition in parts per 100 parts of rubber:

| Rubber | 100 |
|---|---|
| Curing agent | 0.25–8 |
| Curing accelerator | 2.5–3.5 |
| Smoke depressant | 0.5–2.0 |
| Plasticizer | 0–15 |
| Filler | 5–25 |
| Burning rate catalyst | 0–7.8 |

6. In a rocket motor according to claim 5 wherein said solid propellant charge comprises a composite propellant composition comprising ammonium nitrate and a rubbery copolymer of 1,3-butadiene and 2-methyl-5-vinylpyridine, said oxidant comprises ammonium perchlorate, said powder metal comprises aluminum, said rubber comprises a polysulfide liquid polymer, said curing agent comprises p-quinone dioxine and sulfur, said curing accelerator comprises diphenyl guanidine, said smoke depressant comprises magnesium oxide, said plasticizer comprises a topped fraction of dibutoxyethoxyethyl formal, said filler comprises carbon black, and said burning rate catalyst comprises ferric oxide.

7. In a rocket motor according to claim 6 wherein said particulate ignition material comprises a mixture zirconium/nickel alloy, potassium perchlorate, and barium nitrate, said mixture bonded with ethylcellulose.

References Cited in the file of this patent
UNITED STATES PATENTS

| 2,627,810 | Catlin | Feb. 10, 1953 |
|---|---|---|
| 2,685,837 | Sage et al. | Aug. 10, 1954 |
| 2,791,962 | Terce | May 14, 1957 |